M. S. MONTAGUE.
BEET HARVESTER.
APPLICATION FILED JUNE 10, 1918.
1,337,481.
Patented Apr. 20, 1920.
4 SHEETS—SHEET 3.
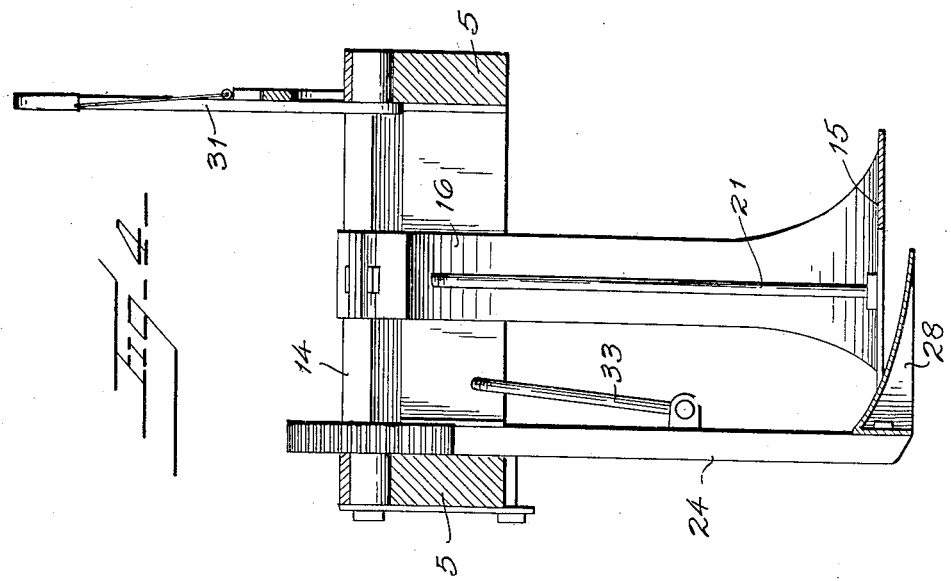
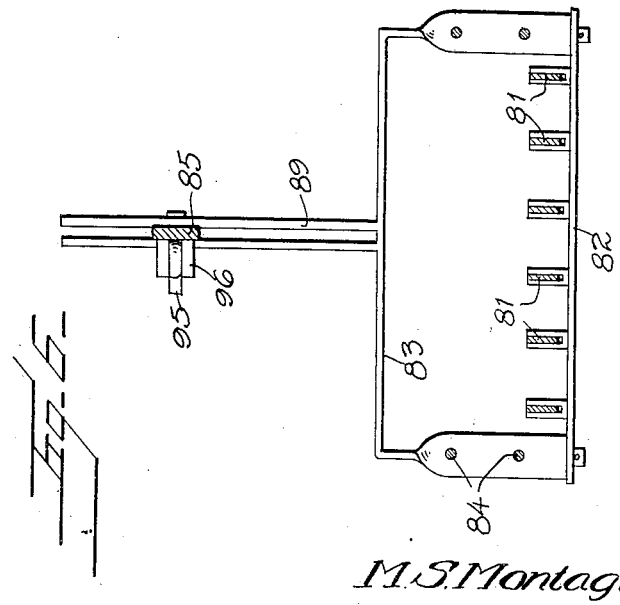
Inventor
M. S. Montague
By Watson E. Coleman
Attorney

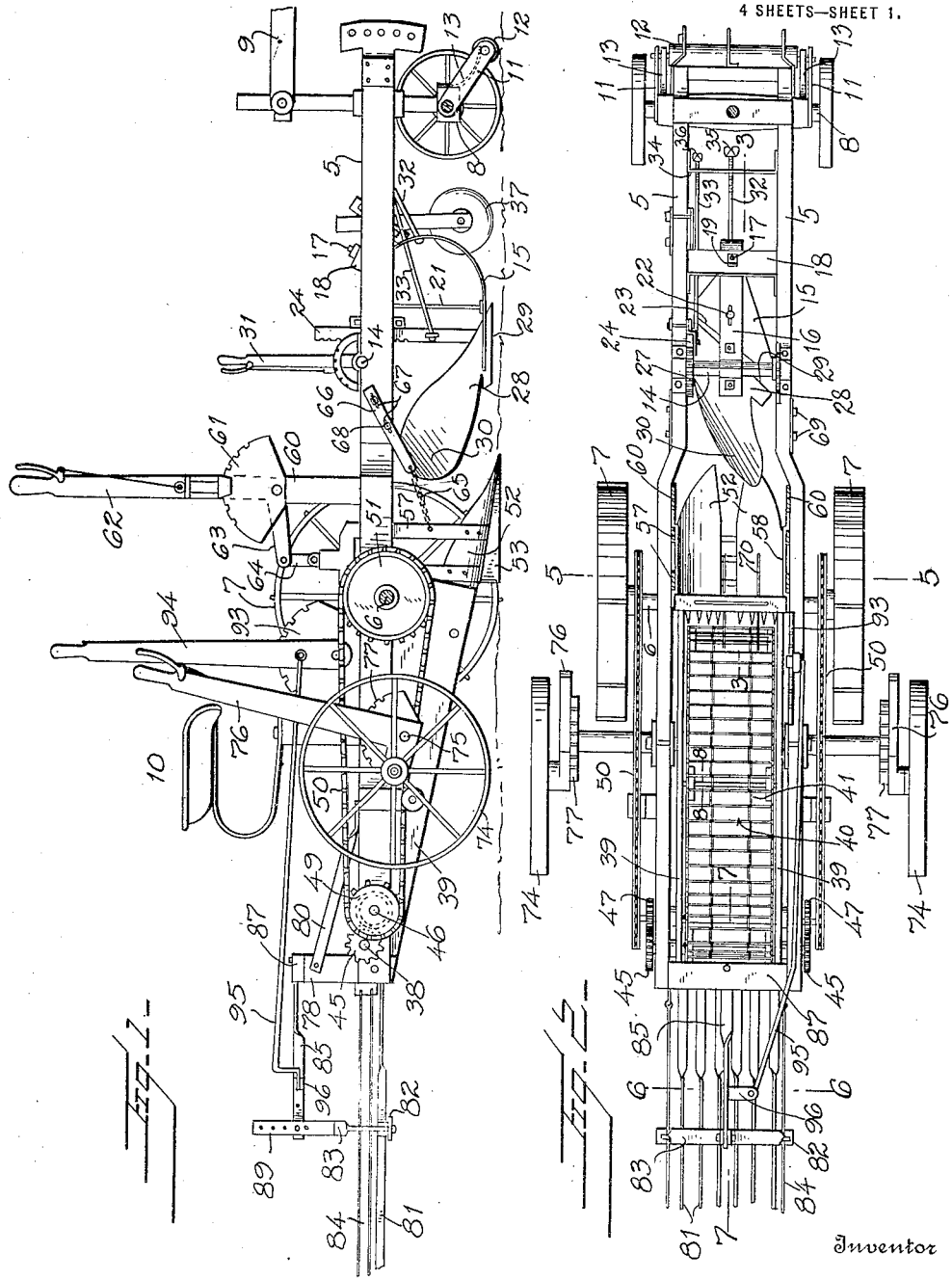

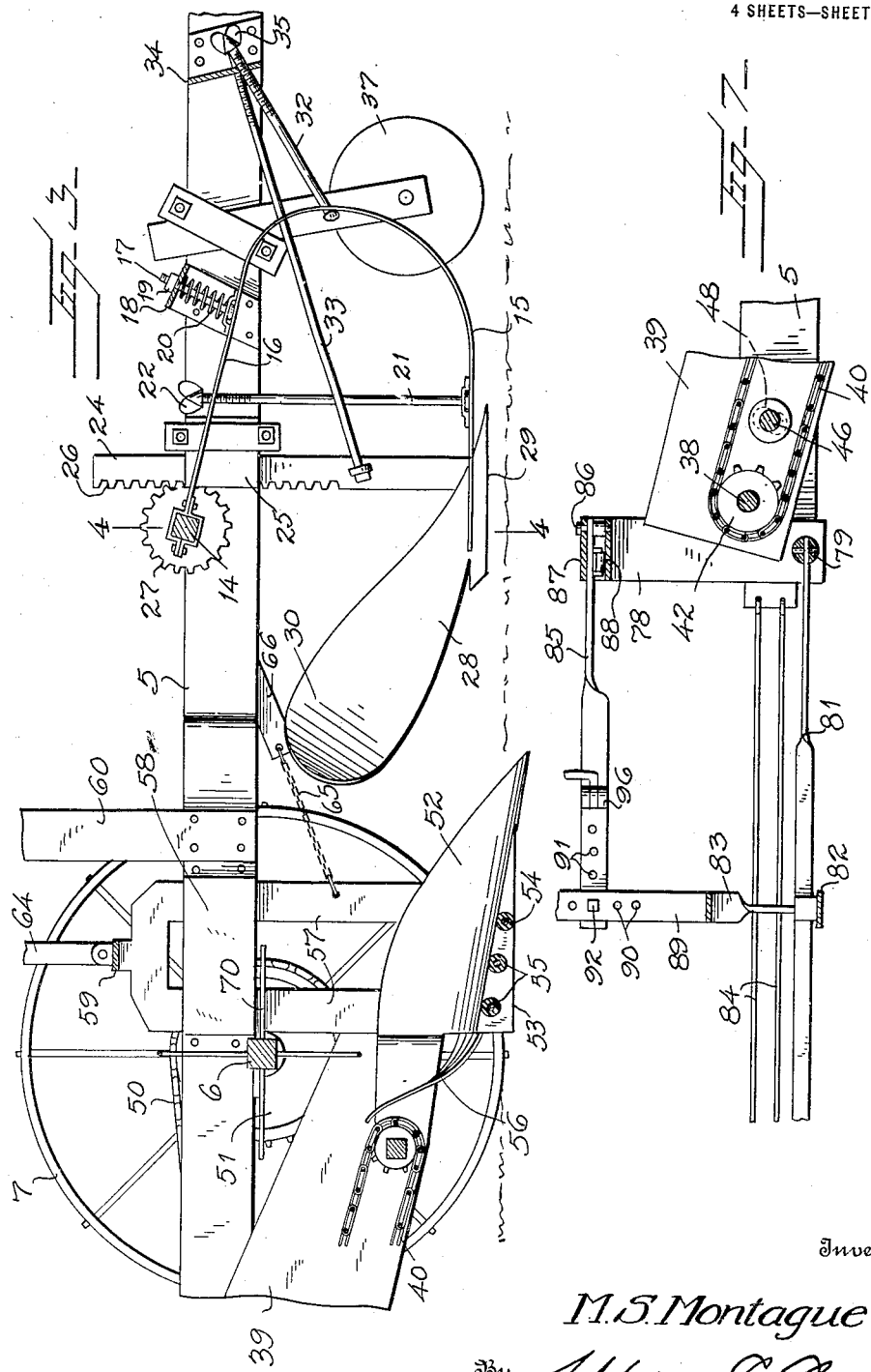

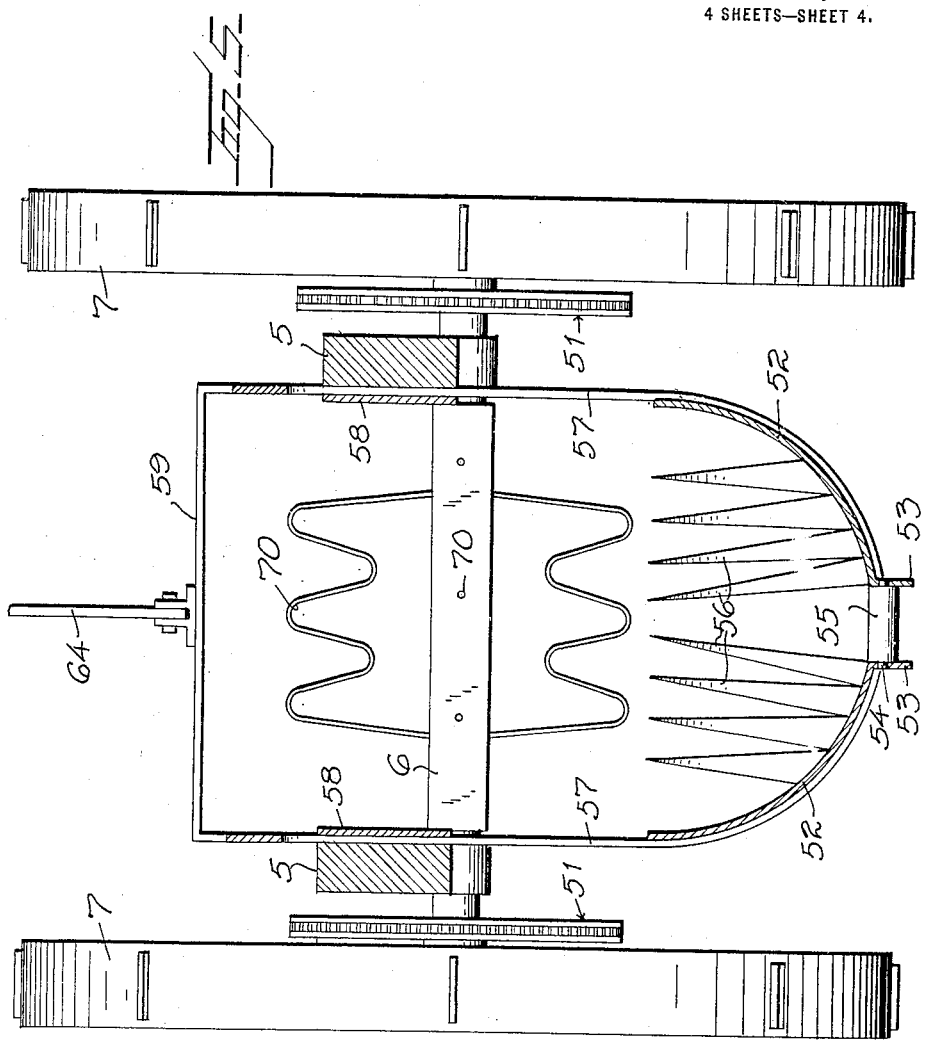
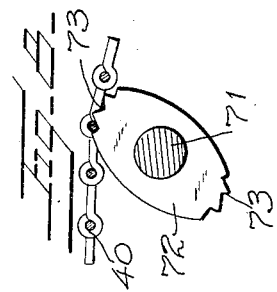

UNITED STATES PATENT OFFICE.

MERRELL S. MONTAGUE, OF RIGBY, IDAHO, ASSIGNOR OF ONE-HALF TO JOSEPH W. JONES, OF RIGBY, IDAHO.

BEET-HARVESTER.

1,337,481. Specification of Letters Patent. Patented Apr. 20, 1920.

Application filed June 10, 1918. Serial No. 239,197.

*To all whom it may concern:*

Be it known that I, MERRELL S. MONTAGUE, a citizen of the United States, residing at Rigby, in the county of Jefferson and State of Idaho, have invented certain new and useful Improvements in Beet-Harvesters, of which the following is a specification, reference being had to the accompanying drawings.

This invention relates to beet harvesters, and has for its primary object to provide a machine for the harvesting of beets and similar vegetables having certain improved features of construction whereby the beets may be extracted from the ground without injury and the beets from a large number of rows deposited upon the ground so that they can be easily collected.

It is one of the more particular objects of the present invention to provide an improved mounting and arrangement of the topping knife for the beets, and simple and efficient means for properly adjusting said knife so that the beet tops, whether they be heavy or light, will be severed close to the crown of the beet.

It is another one of the important objects of the invention to provide an elevator mounted in the machine frame and beet lifting plows attached to the lower end of the elevator, together with means for positively directing the beets from the plows to the elevator, and means for raising and lowering the plows so as to regulate the depth of penetration thereof.

The invention further contemplates the provision of simple and effective means for agitating the stretch of the conveyer carrying the beets whereby the soil is dislodged or loosened therefrom.

The invention has for an additional object the provision of discharge means for the beets extending rearwardly from the upper end of the elevator and embodying a plurality of vertically adjustable tines, and additional means for adjusting the tines transversely with respect to the line of travel of the machine, whereby the beets may be deposited upon the ground at a desired point.

And finally it is a general object of the invention to provide a beet harvesting machine as above characterized, which is relatively simple, as well as strong and durable in its construction, efficient and reliable in practical operation, and capable of manufacture at relatively small cost.

With the above and other objects in view, the invention consists in the improved combination, construction and arrangement of the several parts as will be hereinafter more fully described, subsequently claimed and illustrated in the accompanying drawings, in which similar reference characters designate corresponding parts throughout the several views, and wherein:—

Figure 1 is a side elevation of the machine, one of the wheels being removed;

Fig. 2 is a top plan view, with certain parts omitted;

Fig. 3 is a longitudinal section taken on the line 3—3 of Fig. 2;

Fig. 4 is a tranverse section taken on the line 4—4 of Fig. 3;

Fig. 5 is a transverse section taken on the line 5—5 of Fig. 2;

Fig. 6 is a section taken on the line 6—6 of Fig. 2;

Fig. 7 is a longitudinal section taken on the line 7—7 of Fig. 2; and Fig. 8 is a fragmentary view partly in side elevation and partly in section illustrating one of the agitating members for the elevator.

Referring in detail to the drawings, 5 designates the spaced longitudinal side bars of the machine frame, which are loosely mounted intermediate of their ends for rocking movement upon the transverse axle 6. Upon each end of this axle, a ground wheel 7 is fixed. The machine frame at its forward end is supported by a double wheeled caster 8, to the central vertically disposed spindle of which a pole or other suitable means, indicated at 9, is suitably connected, whereby the caster may be angularly turned and the machine properly steered from the operator's seat, shown at 10. Upon each end of the axle of the steering caster, a forwardly extending arm 11 is loosely engaged, and between the other ends of these arms a roller 12 is rotatably mounted and supported. The arms are urged downwardly by means of leaf springs, shown at 13, which are fixed at one of their ends to the transverse beam of the caster and are engaged at their free ends with the respective arms 11. In the operation of the machine, the leaf springs act to yieldingly urge the roller 12 downwardly so that the beet tops will be depressed at a point in advance of the topping knife, to be presently referred to. It will, of course, be understood that suitable graft means is connected to this forward end of the machine frame.

Upon the frame bars 5, in spaced relation to their forward ends, the ends of a transversely disposed shaft 14 are journaled in suitable bearings. 15 designates a beet top depressing plate, which is preferably of substantially triangular-shaped form, as seen in Fig. 2, and is provided with an upwardly and rearwardly curved attenuation 16, the extremity of which is securely fixed centrally to the shaft 14. A threaded bolt 17 is fixed at its lower end in the attenuation 16 of said plate and extends upwardly through an opening in a transverse metal bar 18, which is fixed to the frame bars 5, and upon said bolt a nut 19 is threaded to permit the downward movement thereof. A spring 20 engaged upon said bolt yieldingly forces the plate 15 downwardly. A rod 21 is rotatably connected at its lower end to the approximate center of the plate 15 and extends upwardly through the rearwardly extending portion 16 of said plate and has threaded engagement therein, the upper end of the rod being provided with suitable means, indicated at 22, whereby it may be conveniently rotated. The metal plate 15 and its attenuation 16 are formed of resilient sheet steel, so that by the adjustment of the rod 21 the plate 15 may be moved upwardly or downwardly with respect to the longitudinally extending end portion 16 thereof. The rear edge of the plate 15 is obliquely inclined transversely of the machine, as shown at 23.

A standard 24 is vertically movable upon the inner side of one of the frame bars 5 and is guided and held by means of the plate 25 fixed to the frame bar so that the rack teeth 26 formed on the rear edge of the standerd are maintained in meshing engagement with the teeth of a gear 27 fixed upon the transverse shaft 14. The beet topping knife 28 is fixed to the lower end of the standard 24 and the cutting edge 29 of this knife likewise extends at an oblique inclination transversely of the machine and substantially in parallel relation to the inclined edge of the plate 15. The topping knife is formed with a rearwardly and upwardly curved wing 30, which directs the severed beet tops transversely to one side of the machine.

A suitable lever 31 is fixed to the shaft 14, whereby said shaft may be rotated to move the standard 24 vertically and thus raise or lower the beet topping knife 28 so that said knife will properly engage the beet tops and sever the same closely adjacent to the crown of the beet.

The opposite, obliquely inclined edges of the plate 15 and the knife 28 may be adjustably spaced from each other by means of the rods, designated 32 and 33 respectively, which are loosely connected at their rear ends to the upwardly curved ends of the plate 15 and to the standard 24. The forward ends of these rods extend through openings formed in a transverse bar 34 which is fixed to the frame bars 5, and said forward ends of the rods have the winged nuts 35 and 36 respectively fixed thereon, said nuts being threaded in the openings in the bar 34.

A rolling colter 37 is mounted upon one of the frame bars 5 just in advance of the plate 15. This colter is provided for the purpose of removing or displacing trash which may have gathered around the beet tops.

It will be understood from the above description that when the beet tops are heavy, the rod 21 is adjusted so as to raise the plate 15 and properly space its obliquely inclined edge above the cutting edge of the topping knife so that the beet tops will be properly depressed for engagement by the knife. When the beet tops are relatively light, the rod 21 is adjusted to lower the plate 15. In this manner, it will be apparent that the knife will effectively cut or sever the beet top cleanly from the beet closely adjacent to the crown thereof under various conditions of growth.

A shaft 38 is journaled in the rear ends of the frame bars 5 and upon this shaft the spaced side rails 39 of an elevator are loosely mounted. 40 designates the flexible elevator or conveyer, which is made up of a plurality of flexibly connected transverse wire links, said links being connected to each other at spaced points by the longitudinally extending links 41. Upon the shaft 38, spaced sprocket wheels 42 are fixed, the teeth of which engage the transverse links of the elevator. A roller 43 is journaled at its ends between the forward ends of this roller to engage the links of the elevator. Upon the ends of the shaft 38 exteriorly of the frame bars 5, the gears 45 are fixed. These gears mesh with the gears 47 fixed upon the ends of a transverse shaft 46, which is mounted in the frame bars and extends through slots 48 provided in the side rails 39 of the elevator. Sprocket wheels 49 are also fixed upon the ends of the shaft 46 and are connected by the endless chains 50 with sprocket wheels 51 fixed upon the supporting axle 6 of the machine.

To the forward lower ends of the elevator rails 39, the rear ends of the beet lifting plows 52 are suitably secured, the inner longitudinal edges of said plows being spaced from each other and extending in forward diverging relation. These inner edges of the plows are provided with downwardly projecting flanges 53 which are connected by the spaced transverse rods 54. On each of these rods, a roller 55 is loosely engaged. These rollers may be constructed of leather, rubber or other suitable friction material. Each of the lifting plows is provided at its rear end with a plurality of rearwardly extending, upwardly curved fingers 56, which terminate adjacent to the forward end of the elevator. Spaced vertically disposed standards 57 are fixed to the outer side of each beet lifting plow and extend upwardly through the guides 58 fixed to the inner sides of the frame bars 5. These standards at their upper ends are connected by a transverse bar 54. A notch bar 60 is also fixed at its ends to the side bars 5 of the frame in advance of the bar 59 and upon said bar 60, a toothed quadrant 61 is fixed. A lever 62 is pivotally mounted upon said quadrant and carries the usual spring pressed dog to engage the teeth thereof. A rod 63 connects the lower end of this lever to the transverse bar 59 through the medium of a link 64 which is pivotally connected to said bar. By manipulating the lever 62, the beet lifting plows, together with the lower end of the elevator, may be raised or lowered so that the plows will penetrate the soil to the desired depth. The downward movement of these plows is limited by the chains 65 connected to the standards 57 and to the rearwardly and downwardly inclined metal plates 66, which are provided with slots 67 to receive the bolts 68 fixed in the frame bars. Clamping nuts 69 are threaded upon these bolts to secure the plates in any adjusted position.

It will be understood that the plows travel along each side of the beet row and as their points penetrate the soil, the beets are lifted and moved rearwardly between and upon the inner edges of the plow blades. The beets being engaged by the sleeves or rollers 55 are positively forced rearwardly and upwardly upon the fingers 56. At this point the beets are engaged by the radially disposed wires 70 which are fixed in the axle 6 and are thereby positively moved rearwardly and upwardly upon said fingers and upon the upper stretch of the elevator.

Upon a transverse rod 71 fixed in the side rails 39 of the elevator, elliptical-shaped members 72 are loosely mounted and at their opposite ends are toothed, as at 73. These notched or toothed ends of said members are adapted to engage the transverse inner links of the upper stretch of the elevator and thereby agitate said elevator so as to loosen the soil or earth which may remain upon the teeth, and such loosened soil will sift freely downwardly between the links of the elevator.

In addition to the ground wheels 7, I provide the wheels 74, each of which is mounted upon the outer end of a crank axle 75, the inner end of which is journaled in a suitable bearing fixed to one of the side bars 5 of the frame. Upon each of the axles 75, the lower end of a lever 76 is fixed, said lever carrying a spring pressed dog for rocking engagement with the teeth of a quadrant 77 fixed to the axle bearing. By adjusting these levers, the wheel 74 may be raised or lowered to support the rear end of the machine frame and the elevator at any desired elevation above the ground surface. Also, by suitably adjusting these wheels, the machine may be properly operated upon hilly or uneven ground.

To the rear end of the side rails 39 of the elevator, the ends of an arched bar 78 are fixed, said ends of the bar extending below the elevator rails and having a roller 79 mounted therebetween. Obliquely disposed braces 80 connect the upper end of the bar 78 to the rails 39. A plurality of rearwardly extending tines 81 are pivotally mounted for transverse swinging movement in the roller 79, said tines being disposed in a common plane and connected intermediate of their ends by the transverse metal bar 82 fixed to the lower ends of a yoke member 83. Additional spaced side tines 84 extend through the arms of this yoke member and are pivotally connected at their forward ends to the arched bar 78. A longitudinally extending bar 85 is pivotally connected at its forward end, as at 86, to the bar 78 and is movable between the latter bar and a cap plate 87 fixed thereon. Upon the bar 85, a roller 88 is mounted to travel upon the bar 78. The inner end of this bar 85 is connected to a standard 89 fixed centrally to the yoke bar 83, said standard having a plurality of openings 90, and the bar 85 likewise being provided with a series of longitudinally spaced openings 91 to receive the adjustable pivot pin 92. By means of this construction, it will be readily seen that the series of tines 81 may be raised or lowered and disposed in any desired horizontal inclination.

Upon one of the side bars 5 of the machine frame. a toothed quadrant 93 is fixed, and a lever 94 is pivotally mounted thereon at its lower end. A rod 95 is pivotally connected at its forward end to said lever and at its rear end to a transversely extending arm 96, which is fixed to the longitudinal bar 89. By operating the lever 94, the discharge tines may be swung transversely with respect to the line of travel of the machine and their rear ends positioned so that the beets harvested from a number of rows may be deposited in a single row upon the ground. In practice I have found it advisable to provide a sufficient range of adjustment so that the beets harvested from five rows as the machine moves first in one direction and then in the reverse direction across the field may be deposited for collection in a single row. In this manner, the collection of the beets after being harvested may be greatly expedited and the manual labor incident thereto reduced to a minimum.

From the foregoing description, taken in connection with the accompanying drawings, it is believed that the construction, and manner of operation of the several parts of the machine will be clearly and fully understood. By means of my invention, a large field of beets may be quickly harvested, the tops and the beets being segregated and deposited in separate rows upon the ground. By the provision of the improved adjusting means for the beet top depressing plate and the topping knife, the beet tops are cleanly severed and the possibility of cutting into or injuring the beet is likewise obviated. The machine as a whole is of relatively simple construction, as well as strong and durable, and is efficient and reliable in practical operation.

While I have herein shown and described the preferred construction and arrangement of the several parts employed, it is to be understood that the machine is susceptible of many modifications therein and I, therefore, reserve the privilege of adopting all such legitimate changes as may be fairly embodied within the spirit and scope of the invention as claimed.

I claim:—

1. In a beet harvesting machine, a beet top depressing plate and a beet topping knife blade disposed in vertical spaced relation to each other, said plate and the knife having opposed obliquely inclined edges, means for adjusting the plate and the knife vertically as a unit, and means for independently adjusting said plate and knife to dispose their inclined edges in predetermined relation to each other in the direction of travel of the machine.

2. In a beet harvesting machine, a frame, a standard vertically movable in the frame, a beet topping knife fixed to the lower end of the standard and having a transverse obliquely inclined cutting edge, means for moving the standard to vertically adjust the topping knife with respect to the ground surface, and a beet top depressing plate arranged in advance of the topping knife and vertically movable therewith.

3. In a beet harvesting machine, a frame, a standard vertically movable in the frame, a beet topping knife fixed to the lower end of said standard, a rotatably mounted shaft, a gear fixed to said shaft, said standard having rack teeth engaged with said gear, a beet top depressing plate arranged in advance of said knife and having a rearward extension fixed to said shaft, said blade being yieldably movable with respect to the extension thereof, means for adjustably positioning said plate with respect to the topping knife, and means for rotating said shaft to vertically adjust the knife and the depressing plate as a unit.

4. A beet topping mechanism comprising, in combination with a portable body, a topping knife carried by the body and having a transverse obliquely inclined cutting edge, a beet top depressing plate carried by the body and arranged in advance of the topping knife, the edge of the depressing plate opposed to the cutting edge of the topping knife being inclined to correspond with the cutting edge of the knife, and means for vertically adjusting the depressing plate independently of the cutting knife.

5. A beet topping mechanism comprising a severing means, a depressing plate positioned in advance of the severing means and provided with a resilient extension, a support to which the extension is secured, and means coacting with the plate and the extension thereof for imparting movement to the plate independently of the severing means.

6. A beet topping mechanism including severing means, a depressing plate positioned in advance thereof and provided with an upwardly and rearwardly curved extension, a support to which the extension is secured, and a rod secured to the plate, said rod and extension of the plate being provided with coacting means whereby the plate may be moved toward or from the extension.

7. A beet topping mechanism including severing means, a depressing plate positioned in advance thereof and provided with an upwardly and rearwardly curved extension, a support to which the extension is secured, and a rod threaded through the extension and in swivel connection with the plate.

8. A beet topping mechanism including severing means, a depressing plate positioned in advance of the severing means and provided with a resilient extension, a support to which the extension is secured, and means coacting with the extension for moving the depressing plate forwardly with respect to and independently of the severing means.

9. A beet topping mechanism including severing means, a depressing plate positioned in advance of the severing means and provided with a resilient extension, a support to which the extension is secured, a rod loosely engaged with the extension, and means for imparting endwise movement to the rod whereby the plate may be moved forwardly with respect to and independently of the severing means.

10. A beet topping mechanism including severing means, a depressing plate positioned in advance thereof and provided with an upwardly and rearwardly directed extension, a support to which the extension is secured, and a spring supported above and bearing down upon the extension.

In testimony whereof I hereunto affix my signature in the presence of two witnesses.

MERRELL S. MONTAGUE.

Witnesses:
M. C. LYDDANE,
D. W. GALL.